United States Patent [19]

Berglund

[11] Patent Number: 4,522,088
[45] Date of Patent: Jun. 11, 1985

[54] TOOL FOR OPENING A PRESSURE COOKER

[76] Inventor: Malcolm F. Berglund, 858 N. 64th St., Mesa, Ariz. 85205

[21] Appl. No.: 563,204

[22] Filed: Dec. 19, 1983

[51] Int. Cl.³ ............................................. B25B 27/00
[52] U.S. Cl. .................................... 81/3.55; 254/131; 294/15
[58] Field of Search .................. 81/3 R, 3.34, 3.46 R; 254/131, 17; 29/267; 294/1 R, 15

[56] References Cited

U.S. PATENT DOCUMENTS 4,059,032 11/1977 Tornell .................................. 81/3 R

*Primary Examiner*—Roscoe V. Parker
*Attorney, Agent, or Firm*—Norman B. Rainer

[57] ABSTRACT

A manually operable hand tool is provided for causing the lid of a pressure cooker to rotate with respect to the underlying vessel of the pressure cooker. The tool is comprised of an elongated handle portion, and a bifurcated gripping head disposed at one extremity of the handle portion. The gripping head is provided with three abutment sites which engage the vertically aligned handles of a sealed pressure cooker. When the handle portion of the tool is downwardly forced, there is a concerted pushing of the vessel and pulling of the lid.

5 Claims, 3 Drawing Figures

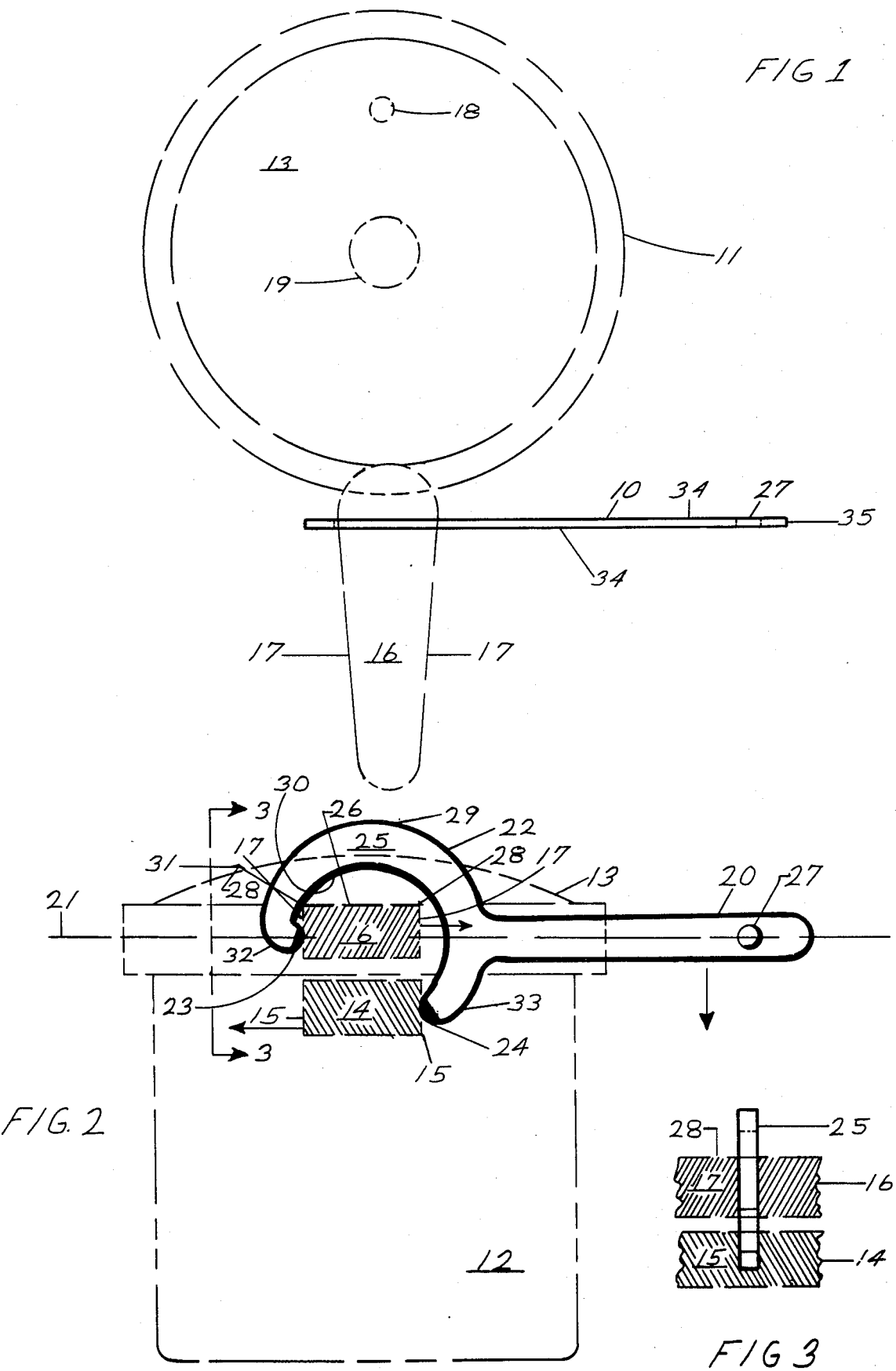

TOOL FOR OPENING A PRESSURE COOKER

BACKGROUND OF THE INVENTION

This invention relates to a tool useful in removing a tight-fitting lid from a vessel, and is more particularly concerned with a tool useful in removing the upper lid from a pressure cooker.

Pressure cookers or autoclaves are in widespread home use for the cooking or sterilization of foodstuffs, and are widely used in industrial applications for heat treatment and sterilization of various materials. In general, pressure cookers or autoclaves are comprised of a sturdy heat-conductive cylindrical vessel and a removable circular lid having a rim capable of making an airtight seal with the vessel. The lid engages the vessel by bayonet-type fittings whereby seating and removal of the lid is accomplished by rotational movement in a plane perpendicular to the cylindrical axis of the vessel. To assist in such rotational movements, a handle is provided in the lid. A matching alignment handle is provided in the vessel adjacent its open upper extremity at a site corresponding to the locking point of the lid. The handles of the lid and vessel serve not only to facilitate turning, but indicate proper alignment and enable the pressure cooker to be comfortably lifted.

When the vessel, containing a volatile liquid such as water, is sealed with its lid and subjected to heating, the liquid develops an autogenous pressure, the magnitude of which is dependent upon the temperature and the vapor pressure of the liquid. A safety valve in the lid permits venting of vapors to avoid excessively high pressures.

The pressure cooker is capable of subjecting a foodstuff to controlled and uniform elevated temperatures without causing drying or oxidation, and for these reasons is eminently suited for the cooking of foods. In sterilization applications, the combined effects of high temperature and high water vapor pressure kill microbes without adversely affecting foodstuffs intended for preservation by canning or bottling. At the termination of a process utilizing a pressure cooker, the lid must be removed to gain access to the interior of the vessel. Even when pressure is vented so that no pressure gradient exists between the interior and exterior of the pressure cooker, the lid, because of its tight-fitting nature, may be difficult to rotate to effect its removal. Because of the round configuration of the pressure cooker, it is difficult to grasp the vessel and lid in a manner to try to exert a separating force. The use of hammers or other percussive devices to effect separation may cause damage to the handles or other parts of the pressure cooker.

It is accordingly an object of the present invention to provide a tool for separating the lid from the vessel of a pressure cooker.

It is a further object of this invention to provide a tool of the aforesaid nature which will not damage the pressure cooker.

It is a still further object of the present invention to provide an improved tool as in the foregoing object of simple and rugged construction which may be economically manufactured.

These objects and other objects and advantages of the invention will be apparent from the following description.

SUMMARY OF THE INVENTION

The above and other beneficial objects and advantages are accomplished in accordance with the present invention by an improved manually operable hand tool which comprises a handle portion elongated about a center axis, and a gripping head disposed at one extremity of said handle portion as a continuous integral extension thereof. The gripping head is of bifurcated configuration, having a forward abutment site disposed substantially in line with the extended axis of said handle portion, and a rearward abutment site disposed below said axis and closer than said forward abutment site to the handle portion. Said forward and rearward abutment sites are disposed in facing relationship at the first and second extremities, respectively, of an arcuately shaped spanning member which defines an engulfing area that extends above said forward abutment site and rearward of said rearward abutment site.

The forward and rearward abutment sites are provided with a layer of protective material intended to promote secure contact with the vertically disposed sides of the handles of the pressure cooker while minimizing any scratching thereof.

The tool is preferably fabricated of a strong material such as iron or aluminum, and is preferably of a flat, thin shape, having a thickness between about $\frac{1}{8}''$ and $\frac{1}{4}''$.

The arcuately shaped spanning member is critically shaped in a manner such that, when the forward and rearward abutment sites engage the handles of the pressure cooker, an upper edge of the lid handle is caused to abut against said spanning member, thereby positioning the tool in a vertical plane with respect to said handles. The site of abutment on said spanning member will hereinafter be referred to as the upper or positioning abutment site.

In operation, the tool is held in a manner such that the forward abutment site engages a side of the lid handle, and the rearward abutment site presses against the opposite side edge of the underlying vessel handle. The tool handle is then forced downwardly, thereby imparting a pushing force to the vessel and an oppositely directed pulling force to the lid. The concerted effect of said pulling and pushing forces causes lateral rotation of the lid with consequent release from its bayonet-type securement.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 1 is a top plan view of an embodiment of the tool of this invention in operative engagement with a pressure cooker of conventional design.

FIG. 2 is a side elevational view of the tool of FIG. 1.

FIG. 3 is an end view taken in the direction 3—3 of FIG. 2.

For convenience in description, the terms "forward" and "rearward", or words of similar import, will have reference to the left and right ends, respectively, of the tool appearing in FIG. 1. Similarly, the expressions "upper" and "lower" and equivalents thereof refer to the upper and lower portions of the tool of FIG. 1.

DESCRIPTION OF THE PREFERRED EMBODIMENT

Referring to FIGS. 1–3, a tool 10 of this invention is shown in operative engagement with a pressure cooker 11 of conventional design comprised of vessel 12 of circular cylindrical configuration, and upwardly domed lid 13. The vessel is provided at its uppermost extremity with an elongated lifting handle 14 having substantially flat vertical sides 15. The lid is provided with an elongated turning handle 16 having substantially flat vertical sides 17, and upper edges 28. In the locked position of the lid, turning handle 16 will be positioned directly above lifting handle 14, as shown in FIG. 2. A pressure relief valve 18 and pressure indicator 19 are also associated with the lid.

The tool is of monolithic construction, comprised of a handle portion 20 elongated about center axis 21, and a gripping head 22 disposed at one extremity of said handle portion. The configuration of the tool is defined by flat parallel surfaces 34, and continuous perimeter edge 35 perpendicularly disposed to surfaces 34. The gripping head is of bifurcated configuration, having a forward abutment site 23 disposed substantially in line with axis 21, and a rearward abutment site 24 disposed below said axis and closer than said forward abutment site to the handle portion.

Said forward and rearward abutment sites are of rounded contour and disposed in facing relationship at the first and second extremities 32 and 33, respectively, of an arcuately shaped spanning member 25 defined by outer edge 29 and inner edge 30. Said inner edge, which may be a smooth curve or may have straight segments, defines an engulfing area 26 that extends above said forward abutment site and rearward of said rearward abutment site.

The forward and rearward abutment sites are provided with a coating of protective material as indicated by the shaded areas adjacent said abutment sites. Said coating, which in some embodiments may encompass the entire tool, is intended to promote secure contact of the abutment sites with the handles of the pressure cooker while minimizing any damage thereto. Suitable coatings include, for example, plasticized polyvinylchloride, neoprene and polyfluorinated elastomers.

The handle portion may contain an aperture 27 to facilitate hanging storage of the tool.

In use, the tool is placed over the handles of the pressure cooker in a manner such that an upper edge 28 of the lid handle abuts against inner edge 30 of the spanning member at an upper abutment site 31. When the tool is thusly seated, forward abutment site 23 contacts vertical side 17 of lid handle 16, and rearward abutment site 24 contacts an opposite vertical side of vessel handle 14. As shown by the arrows in FIG. 2, downward motion of handle portion 20 applies a pushing force to the vessel and a concerted pulling force to the lid, whereby the lid is rotated horizontally.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A manually operable hand tool for causing the lid of a pressure cooker to rotate with respect to the underlying vessel of said pressure cooker, and adapted to engage the vertical sides of vertically aligned handles of said lid and vessel, said tool comprising a handle portion elongated about a center axis, and a gripping head disposed at one extremity of said handle portion as a continuous integral extension thereof, said gripping head being of bifurcated configuration and comprised of an arcuately shaped spanning member having first and second extremities and defining an engulfing area, a forward abutment site and a rearward abutment site disposed in facing relationship adjacent said first and second extremities, respectively, said engulfing area extending above said forward abutment site and rearward of said rearward abutment site, and an upper abutment site located on said spanning member within said engulfing area, whereby placement of said tool over the aligned handles of said pressure cooker in a manner such that an upper edge of the lid handle contacts said upper abutment site causes said forward abutment site to contact a vertical side of said lid handle and said rearward abutment site to contact an opposite vertical side of the underlying vessel handle, and subsequent downward motion of said handle portion applies a concerted pushing force to said vessel and pulling force to said lid.

2. The hand tool of claim 1 wherein said forward and rearward abutment sites are provided with a coating which promotes secure contact of said abutment sites with the handles of said pressure cooker.

3. The hand tool of claim 1 of monolithic construction and fabricated of a strong metal.

4. The hand tool of claim 3 having a substantially flat configuration and a thickness between about ⅛" and ¼".

5. The hand tool of claim 3 having a configuration defined by two flat parallel surfaces and a continuous perimeter edge surface disposed perpendicularly to said parallel surfaces.

* * * * *